United States Patent
Gabriel et al.

(10) Patent No.: US 6,584,468 B1
(45) Date of Patent: Jun. 24, 2003

(54) METHOD AND APPARATUS TO RETRIEVE INFORMATION FROM A NETWORK

(75) Inventors: Kaigham J. Gabriel, Pittsburgh, PA (US); Evan M. Indianer, Pittsburgh, PA (US); Christopher M. Umbel, Pittsburgh, PA (US); Joel Lenhart, Pittsburgh, PA (US)

(73) Assignee: NineSigma, Inc., Cleveland, OH (US)

(*) Notice: Subject to any disclaimer, the term of this patent is extended or adjusted under 35 U.S.C. 154(b) by 357 days.

(21) Appl. No.: 09/675,594

(22) Filed: Sep. 29, 2000

(51) Int. Cl.[7] .............................. G06F 17/30; G06F 7/00
(52) U.S. Cl. ............................................. 707/10; 707/5
(58) Field of Search .............................. 707/3, 5, 10, 4, 707/100, 104.1, 1; 709/223, 225

(56) References Cited

U.S. PATENT DOCUMENTS

| | | | |
|---|---|---|---|
| 5,724,567 A | 3/1998 | Rose et al. | 395/602 |
| 5,835,087 A | 11/1998 | Herz et al. | 345/327 |
| 5,842,206 A | 11/1998 | Sotomayor | 707/5 |
| 5,855,015 A | * 12/1998 | Shoham | 707/5 |
| 5,875,446 A | 2/1999 | Brown et al. | 707/3 |
| 5,903,892 A | * 5/1999 | Hoffert et al. | 709/225 |
| 5,913,208 A | 6/1999 | Brown et al. | 707/3 |
| 5,966,126 A | 10/1999 | Szabo | 345/348 |
| 5,974,409 A | 10/1999 | Sanu et al. | 707/3 |
| 5,983,221 A | 11/1999 | Christy | 707/5 |
| 5,987,454 A | * 11/1999 | Hobbs | 707/3 |
| 6,029,161 A | 2/2000 | Lang et al. | 707/1 |
| 6,038,574 A | 3/2000 | Pitkow et al. | 707/513 |

(List continued on next page.)

FOREIGN PATENT DOCUMENTS

| | | | |
|---|---|---|---|
| WO | WO 98/18088 | 4/1998 | G06F/17/30 |
| WO | WO 99/48028 | 9/1999 | G06F/17/30 |
| WO | WO 99/57656 | 11/1999 | G06F/17/30 |
| WO | WO 00/38086 | 6/2000 | G06F/17/30 |

OTHER PUBLICATIONS

Budi Yuwono and Dik L. Lee (1996), Search and Ranking Algorithms for locating resources on the world wide web, pp. 164–171.*
Krishna Bharat and Monika R. Henzinger (1998), Improved Algorithms for Topic Distillation in a Hyperlinked Environment, pp. 104–111.*
"About Mamma" Internet Search Engine, http://www.mamma.com Jul. 9, 2001.
"CNET Search" Internet Search Engine, http://www.savvy-.search.com Jul. 9, 2001.
"MetaCrawler Today" Internet Search Engine, http://www-.metacrawler.com Jul. 9, 2001.
"Multiple Search Engine" Internet Search Engine, http://www.196.3.0.4 Jul. 9, 2001.
"Making the Web Work Wonders" Internet Search Engine, http://www.wonderport.com Jul. 9, 2001.

Primary Examiner—Safet Metjahic
Assistant Examiner—Merilyn Nguyen
(74) Attorney, Agent, or Firm—Morgan, Lewis & Bockius LLP

(57) ABSTRACT

A method and apparatus to index network information is described. A network is searched for files of information relevant to people and resources in a particular field using a search list of weighted links to said files. The information is parsed into content and additional links to additional files. The content is weighted and copied to memory (such as a database). A determination is made as to whether the additional links are relevant to the people and resources in the given technical field. Those additional links that are relevant are weighted using a predetermined weighting algorithm. The relevant additional weighted links are copied to the search list. This process continues until an ending condition occurs.

28 Claims, 8 Drawing Sheets

U.S. PATENT DOCUMENTS

| | | | |
|---|---|---|---|
| 6,055,538 A | 4/2000 | Kessenich et al. | 707/101 |
| 6,067,552 A | 5/2000 | Yu | 707/501 |
| 6,078,914 A | 6/2000 | Redfern | 707/3 |
| 6,078,917 A | 6/2000 | Paulsen, Jr. et al. | 707/6 |
| 6,085,186 A | 7/2000 | Christianson et al. | 707/3 |
| 6,182,065 B1 * | 1/2001 | Yeomans | 707/3 |
| 6,295,559 B1 * | 9/2001 | Emens et al. | 707/2 |
| 6,356,899 B1 * | 3/2002 | Chakrabarti et al. | 707/5 |
| 6,389,467 B1 * | 5/2002 | Eyal | 709/223 |
| 6,434,556 B1 * | 8/2002 | Levin et al. | 707/4 |
| 6,438,539 B1 * | 8/2002 | Korolev et al. | 707/3 |

* cited by examiner

| Weight | Full Text | URL | Parent | KeyWordMatch | Iteration | Id |
|---|---|---|---|---|---|---|
| 0 | The Microelectromechanical Systems (MEMS) Resource | http://mems.cwru.edu/memsa | <NULL> | <NULL> | 1 | 1 |
| 0 | The MEMS Exchangesm coordinates a virtual fab, a net | http://www.mems-exchange.org/ | <NULL> | <NULL> | 1 | 2 |
| 0 | MEMS, Fabrication, Consulting, Micromechanics, MST, f | http://www.trimmer.net/ | <NULL> | <NULL> | 1 | 3 |
| 1 | Edinburgh will concentrate on developing processes co | http://www.ee.ed.ac.uk/STR/research | http://www.mems-exchange.org/ | 1 | 2 | 4 |
| 1 | Microsensors and microactuators - design/modeling, fal | http://mems.cwru.edu/Pages/acknow | http://mems.cwru.edu/ | 0 | 2 | 5 |
| 1 | Scaling of micromechanics and MEMS - how things cha | http://home.earthlink.net/~trimmerw/ | http://www.trimmer.net/ | 1 | 2 | 6 |
| 1 | Home | About the Case School of Engineering | Adminis | http://mems.cwru.edu/Pages/contact | http://mems.cwru.edu | 0 | 2 | 7 |
| 2 | Index of projects | http://www.ee.ed.ac.uk/index2.htm | http://www.ee.ed.ac.uk/STR/research_projects/MEM | <NULL> | 3 | 8 |
| 2 | Research needs for the field | http://home.earthlink.net/~trimmerw | http://www.trimmer.net/ | <NULL> | 3 | 9 |
| 2 | Silicon based MEMS projects of 1999-2000 | http://home.earthlink.net/~trimmerw | http://www.trimmer.net/ | <NULL> | 3 | 10 |
| 2 | We researched silicon based micromachines under adv | http://www.ee.ed.ac.uk/mems0 | http://www.ee.ed.ac.uk/STR/research_projects/MEM | <NULL> | 3 | 11 |
| 2 | Welcome to Case Western, new students apply here | http://www.case.cwru.edu/micro.php | http://www.case.cwru.edu/ | <NULL> | 3 | 12 |

FIG. 5

| SQL Server Enterprise Manager - [2:Data in Table 'Iteration1'] | | | | |
|---|---|---|---|---|
| Console Window Help | | | | |
| Weight | Full Text | URL | Parent | KeyWordMatch | Iteration | Id |
|---|---|---|---|---|---|---|
| 0 | The Microelectromechanical Systems (MEMS) Resource | http://mems.cwru.edu/memsa | <NULL> | 1 | 1 | 1 |
| 0 | The MEMS Exchangesm coordinates a virtual Fab, a net | http://www.mems-exchange.org/ | <NULL> | <NULL> | 1 | 2 |
| 0 | MEMS, Fabrication, Consulting, Micromechanics, MST, f | http://www.trimmer.net/ | <NULL> | <NULL> | 1 | 3 |
| 1 | Edinburgh will concentrate on developing processes co | http://www.ee.ed.ac.uk/STR/research | http://www.mems-exchange.org/ | 1 | 2 | 4 |
| 1 | Microsensors and microactuators - design/modeling, fal | http://mems.cwru.edu/Pages/acknow | http://mems.cwru.edu/ | 0 | 2 | 5 |
| 1 | Scaling of micromechanics and MEMS - how things cha | http://home.earthlink.net/~trimmerw/ | http://www.trimmer.net/ | 1 | 2 | 6 |
| 2 | Home | About the Case School of Engineering | Adminis | http://www.case.cwru.edu/ | http://mems.cwru.edu/memsa | 0 | 2 | 7 |
| 2 | Index of projects | http://mems.cwru.edu/Pages/contact | http://mems.cwru.edu | 0 | 3 | 8 |
| 2 | Research needs for the field | http://www.ee.ed.ac.uk/index2.htm | http://www.ee.ed.ac.uk/STR/research_project/MEM | 1 | 3 | 9 |
| 1 | Silicon based MEMS projects of 1999-2000 | http://home.earthlink.net/~trimmerw | http://www.trimmer.net/ | 2 | 3 | 10 |
| 0 | We researched silicon based micromachines under adv | http://www.ee.ed.ac.uk/mems0 | http://www.ee.ed.ac.uk/STR/research_project/MEM | 3 | 3 | 11 |
| 2 | Welcome to Case Western, new students apply here | http://www.case.cwru.edu/micro.php | http://www.case.cwru.edu/ | 0 | 3 | 12 |

FIG. 6

SQL Server Enterprise Manager - [2:Data in Table 'Iteration1']
Console Window Help

| Weight | Full Text | URL | Parent | KeyWordMatch | Iteration | Id | processedbefore |
|---|---|---|---|---|---|---|---|
| 0 | The Microelectrome | http://mems.cwru.edu/memsa | <NULL> | <NULL> | 1 | 1 | <NULL> |
| 0 | The MEMS Exchang | http://www.mems-exchange.org/ | <NULL> | <NULL> | 1 | 2 | <NULL> |
| 0 | MEMS, Fabrication, | http://www.trimmer.net/ | <NULL> | <NULL> | 1 | 3 | <NULL> |
| 1 | Edinburgh will conc | http://www.ee.ed.ac.uk/STR/research_projects/MEMS | http://www.mems-exchange.org/ | 1 | 2 | 4 | <NULL> |
| 1 | Microsensors and mi | http://mems.cwru.edu/Pages/acknowledgements.html | http://mems.cwru.edu/ | 0 | 2 | 5 | <NULL> |
| 1 | Scaling of micromec | http://home.earthlink.net/~trimmerwmems/ | Http://www.trimmer.net/ | 1 | 2 | 6 | <NULL> |
| 1 | Home | About the C | http://www.case.cwru.edu/ | http://mems.cwru.edu/memsa | 0 | 2 | 7 | <NULL> |
| 2 | Index of projects | http://mems.cwru.edu/Pages/contactus.html | http://mems.cwru.edu | 0 | 3 | 8 | <NULL> |
| 2 | Research needs for | http://www.ee.ed.ac.uk/index2.htm | http://www.ee.ed.ac.uk/STR/research_projects/MEMS/inde | 1 | 3 | 9 | <NULL> |
| 2 | Silicon based MEMS | http://home.earthlink.net/~trimmerw/elect | http://www.trimmer.net/~trimmerw/mems | 2 | 3 | 10 | <NULL> |
| 2 | We researched silic | http://www.ee.ed.ac.uk/mems0 | http://www.ee.ed.ac.uk/STR/research_projects/MEMS/inde | 3 | 3 | 11 | <NULL> |
| 2 | Welcome to Case W | http://www.case.cwru.edu/micro.php3 | http://www.case.cwru.edu/ | 0 | 3 | 12 | <NULL> |
| 3 | Greeting Associate | http://www.case.cwru.edu/case-associates/ | http://www.ee.ed.ac.uk/STR/research_projects/MEMS/inde | <NULL> | 4 | 13 | <NULL> |
| 3 | Tools for the mode | http://www.ee.ed.ac.uk/engineering/ | http://www.ee.ed.ac.uk/STR/research_projects/MEMS/inde | <NULL> | 4 | 14 | <NULL> |
| 3 | Forward thinking | http://home.earthlink.net/~trimmerw/forward/index/ | http://www.case.cwru.edu/ | <NULL> | 4 | 15 | <NULL> |
| 3 | Passing knowledg c | http://home.earthlink.net/~trimmerw/secondhand/ | http://www.case.cwru.edu/ | <NULL> | 4 | 16 | <NULL> |
| 3 | Scaling of microme | http://home.earthlink.net/~trimmerw/mems | http://www.case.cwru.edu/ | <NULL> | 4 | 17 | <NULL> |

FIG. 7

| Weight | Full Text | URL | Parent | KeyWordMatch | Iteration | Id | processedbefore |
|---|---|---|---|---|---|---|---|
| 0 | The Microelectrome | http://mems.cwru.edu/memsa | <NULL> | <NULL> | 1 | 1 | <NULL> |
| 0 | The MEMS Exchang | http://www.mems-exchange.org/ | <NULL> | <NULL> | 1 | 2 | <NULL> |
| 0 | MEMS, Fabrication, | http://www.trimmer.net/ | <NULL> | <NULL> | 1 | 3 | <NULL> |
| 1 | Edinburgh will conc | http://www.ee.ed.ac.uk/STR/research_projects/MEMS | http://www.mems-exchange.org/ | 1 | 2 | 4 | <NULL> |
| 1 | Microsensors and mi | http://mems.cwru.edu/Pages/acknowledgements.html | Http://mems.cwru.edu/ | 0 | 2 | 5 | <NULL> |
| 1 | Scaling of micromec | http://home.earthlink.net/~trimmerwmeans/ | http://www.trimmer.net/ | 1 | 2 | 6 | <NULL> |
| 1 | Home | About the C | http://www.case.cwru.edu/ | http://mems.cwru.edu/memsa | 0 | 2 | 7 | <NULL> |
| ▲ 1 | Index of projects | http://mems.cwru.edu/Pages/contactus.html | http://mems.cwru.edu | 0 | 3 | 8 | <NULL> |
| 2 | Research needs for | http://www.ee.ed.ac.uk/index2.htm | http://www.ee.ed.ac.uk/STR/research_project/MEMS/inde | 1 | 3 | 9 | <NULL> |
| 1 | Silicon based MEMS | http://home.earthlink.net/~trimmerw/elect | http://home.earthlink.net/~trimmerw/mems | 2 | 3 | 10 | <NULL> |
| 0 | We researched silic | http://www.ee.ed.ac.uk/mems0 | http://www.ee.ed.ac.uk/STR/research_projects/MEMS/inde | 3 | 3 | 11 | <NULL> |
| 2 | Welcome to Case W | http://www.case.cwru.edu/micro.php3 | http://www.case.cwru.edu/ | 0 | 3 | 12 | <NULL> |
| 3 | Greeting Associate | http://www.case.cwru.edu/case-associates/ | http://www.ee.ed.ac.uk/STR/research_projects/MEMS/inde | <NULL> | 4 | 13 | <NULL> |
| 3 | Tools for the mode | http://www.ee.ed.ac.uk/engineering/ | http://www.ee.ed.ac.uk/STR/research_projects/MEMS/inde | <NULL> | 4 | 14 | <NULL> |
| 3 | Forward thinking | http://home.earthlink.net/~trimmerw/forward/index. | http://www.case.cwru.edu/ | <NULL> | 4 | 15 | <NULL> |
| 3 | Passing knowledg c | http://home.earthlink.net/~trimmerw/secondhand/ | http://www.case.cwru.edu/ | <NULL> | 4 | 16 | <NULL> |
| 3 | Scaling of microme | http://www.case.cwru.edu/ | http://home.earthlink.net/~trimmerw/elect | <NULL> | 4 | 17 | 1 |

FIG. 8

METHOD AND APPARATUS TO RETRIEVE INFORMATION FROM A NETWORK

FIELD OF THE INVENTION

The invention relates to communications in general. More particularly, the invention relates to a method and apparatus to retrieve information from a network such as the Internet.

BACKGROUND OF THE INVENTION

The existing amount of information available over the Internet and World Wide Web (WWW) is staggering. There are literally millions of "web pages" full of information on almost any topic of interest. Moreover, this amount of information is increasing at a geometric rate. This sheer volume of information has made the search for specific types of information a significant challenge. The complexity of this challenge may be better understood with some background information regarding the Internet and WWW in general.

The Internet comprises a network of computers interconnected by some form of communication medium. The type of computer could range from handheld computers and pocket PCs to high-end mainframe and supercomputers. The communication mediums may vary between twisted pair, co-axial cable, optical fibers and radio-frequencies. Each computer is equipped with software and hardware that enables each computer to communicate using the same procedures or language. These procedures and language are often referred to as protocols, which are often layered over one another to form something called a "protocol stack." One such protocol is referred to as the Hypertext Transfer Protocol (HTTP) and it permits the transfer of Hypertext Markup Language (HTML) documents between computers. The HTML documents are often referred to as "web pages" and are files containing information in the form of text, video, images, links to other web pages, and so forth. Each web page is stored in a computer (sometimes referred to as an "Internet Server") and has a unique address referred to as a Universal Resource Locator (URL). The URL is used by a program referred to as a "web browser" located on one computer to find a web page stored somewhere on another computer connected to the network. This creates a "web" of computers each storing a number of web pages that can be accessed and transferred using a standard protocol, and hence this web of computers is referred to as the WWW.

A complete field of technology has arisen that focuses upon making it easier for a user to find information available over the Internet. There are a large number of "search engines" that permit the user to enter key words or phrases. The search engine then searches the Internet to find web pages that contain the key terms. The results are then presented to the user in some sort of ranked fashion. Given the sheer volume of information available over the Internet and WWW, however, search time can be extremely long. This is particularly problematic in an age when users are demanding faster performance in information retrieval tools. Moreover, the search results may often have little relevance to the user's initial request.

In order to accelerate the search process, some search engines build internal databases using a search program referred to as a "web crawler." The idea is that by building an internal database, much of the search work can be done prior to a user's request for information thereby decreasing search times. A web crawler performs as its name suggests. The program periodically "crawls" or searches the Internet and attempts to catalog or index the information available in certain web pages. The index is stored in a database that is accessible to the search engine. In this manner, when a user enters a search term, the internal database is searched first in a relatively fast and efficient manner.

A problem with conventional web crawlers, however, is that they are designed to collect a limited set of information about the web page. Each web page typically has a list of terms provided by the web page designer that attempts to identify the content found within the web page. The web crawler retrieves this list of terms and stores the terms in a database. This list of terms, however, is typically limited to what the web designer deems significant. Consequently, it may not be accurate or comprehensive. Moreover, in many instances, this list may contain terms that are misleading. For example, a web page having information about a particular brand of car may include in its list of terms the name of several competitors. When the user inputs the competitor's name in a search engine, the unintended web page would be retrieved as part of the search results.

Another problem with conventional web crawlers is that they are designed to locate general information. They simply search for web pages in a random manner and index those web pages within the initial search parameters. These conventional web crawlers, however, are not optimized to locate a specific set or domain of information. Accordingly, the conventional web crawler is not efficient or effective when attempting to catalog or index specialized information.

In view of the foregoing, it can be appreciated that a substantial need exists for a web crawler that solves the above-discussed problems.

SUMMARY OF THE INVENTION

One embodiment of the invention comprises a method and apparatus to index network information. A network is searched for files of information relevant to people and resources in a particular field using a search list of weighted links to the files. The information is parsed into content and additional links to additional files. The content is weighted and copied to memory (such as a database). A determination is made as to whether the additional links are relevant to the people and resources in the given particular field. Those additional links that are relevant are weighted using a predetermined weighting algorithm. The relevant additional weighted links are copied to the search list. This process continues until an ending condition occurs.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 5 is an image of a database program having a first list of weighted URLs in accordance with one embodiment of the invention.

FIG. 6 is an image of a database program having a second list of weighted URLs in accordance with one embodiment of the invention.

FIG. 7 is an image of a database program having a third weighted list of URLs in accordance with one embodiment of the invention.

FIG. 8 is an image of a database program having a fourth weighted list of URLs in accordance with one embodiment of the invention.

DETAILED DESCRIPTION

Figure 1:
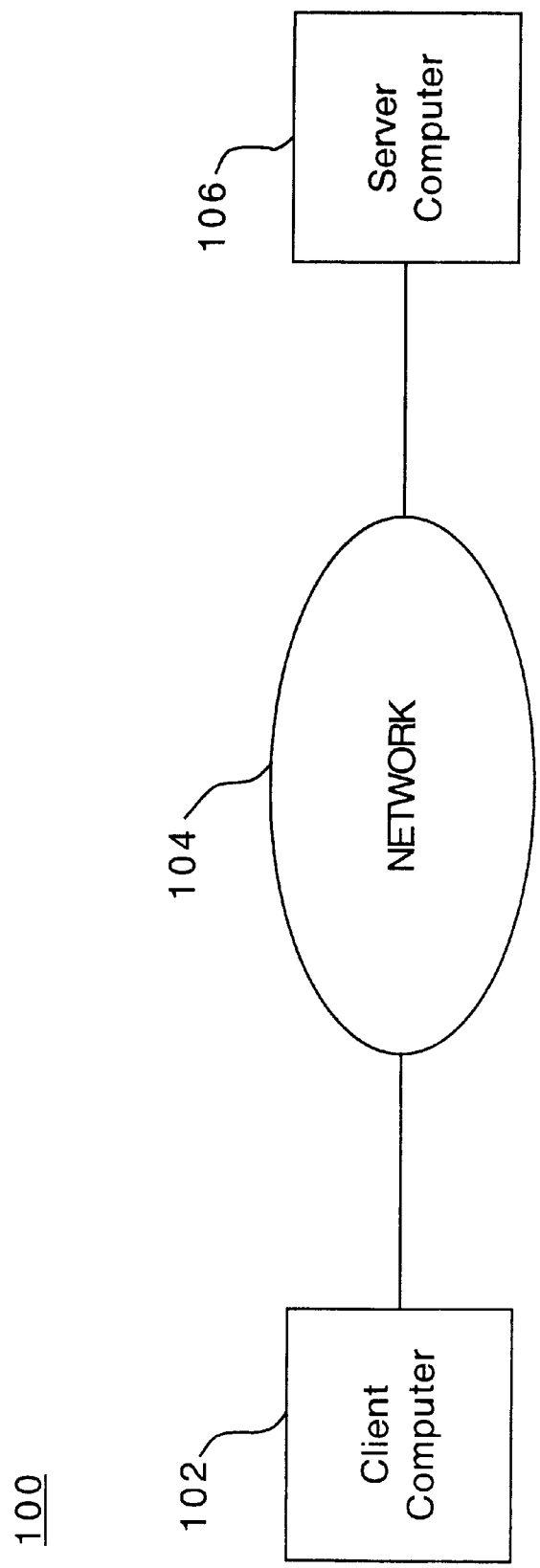
FIG. 1 is a system suitable for practicing one embodiment of the invention.

The embodiments of the invention comprise a method and apparatus to search a network for information relevant to people and resources in a particular field, and to index such information in an internal database. It is a frequent problem that various companies and research institutions have need for people and resources within a particular field. Examples of a particular field might be technical fields such as engineering or life sciences, or professional fields such as legal, medical, finance or accounting. For example, a chemical research company may have identified a new type of material that has highly desirable electrical properties. The chemical research company may not have the necessary expertise in electrical engineering to properly test and refine the material. Therefore, it would be desirable to have access to a database of information that contains information regarding people with expertise in electrical engineering and semiconductor research, as well as the necessary resources to perform such research such as testing equipment and so forth.

The level of specific information desired by the above example would be beyond the capabilities of conventional search engines. Conventional search engines would not be able to return the tightly focused, detailed and comprehensive set of search results needed to identify and procure the necessary research and development capabilities. This occurs for those general disadvantages associated with search engines and web crawlers detailed above, and others as well. For example, conventional web crawlers do not typically look to the content of the web page in order to ascertain the type of information contained within the web page. Moreover, conventional web crawlers do not attempt to analyze and quantify this information for purposes of further refining the search.

The embodiments of the invention address these limitations and more. The embodiments of the invention are designed to actually parse each web page into its component parts and store the parsed information in an internal or local database. The embodiments of the invention also identify links within a web page, and evaluate each link to determine whether it is relevant to the given technical field. This is accomplished by various techniques, including key word matches, domain matching and a proprietary weighting technique. The web pages corresponding to relevant links are in turn parsed and indexed themselves. This process continues until there are no more relevant links or the process is terminated. In this manner, the embodiments of the invention are self-learning, in that the initial seeds used in the master search list are augmented by relevant child links found within the seed web pages. As a result, the web crawler creates an internal database that contains highly focused and relevant information for a particular field. This database can be used for various applications, such as quickly identifying people and/or resources that may be appropriate for various research projects in a particular technical or professional discipline.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 is a block diagram of a communication system 100 comprising a client computer system 102 and a server computer system 106 connected via a network 104. In one embodiment of the invention, network 104 is a network capable of communicating using a variety of protocols, such as the Transport Control Protocol/Internet Protocol (TCP/IP) used by the Internet and the HTTP used by the WWW. Server computer system 106 is a web application server, and contains one or more web pages. The term "web page" is defined herein to include any computer file of information available for transfer over a network, such as a text file, a Portable Document Format (PDF) file, an HTML file, an Extensible HTML (XHTML) file, an Extensible Markup Language (XML) file, an Excel Table Markup Language (XTML) file, a Virtual Reality Modeling Language (VRML) or a VHML file. A web page residing on server computer system 106 may be accessed and retrieved using known techniques, e.g., an HTTP or File Transfer Protocol (FTP) request from client computer system 102 via a web browser or other HTTP and FTP compatible program.

Figure 2:
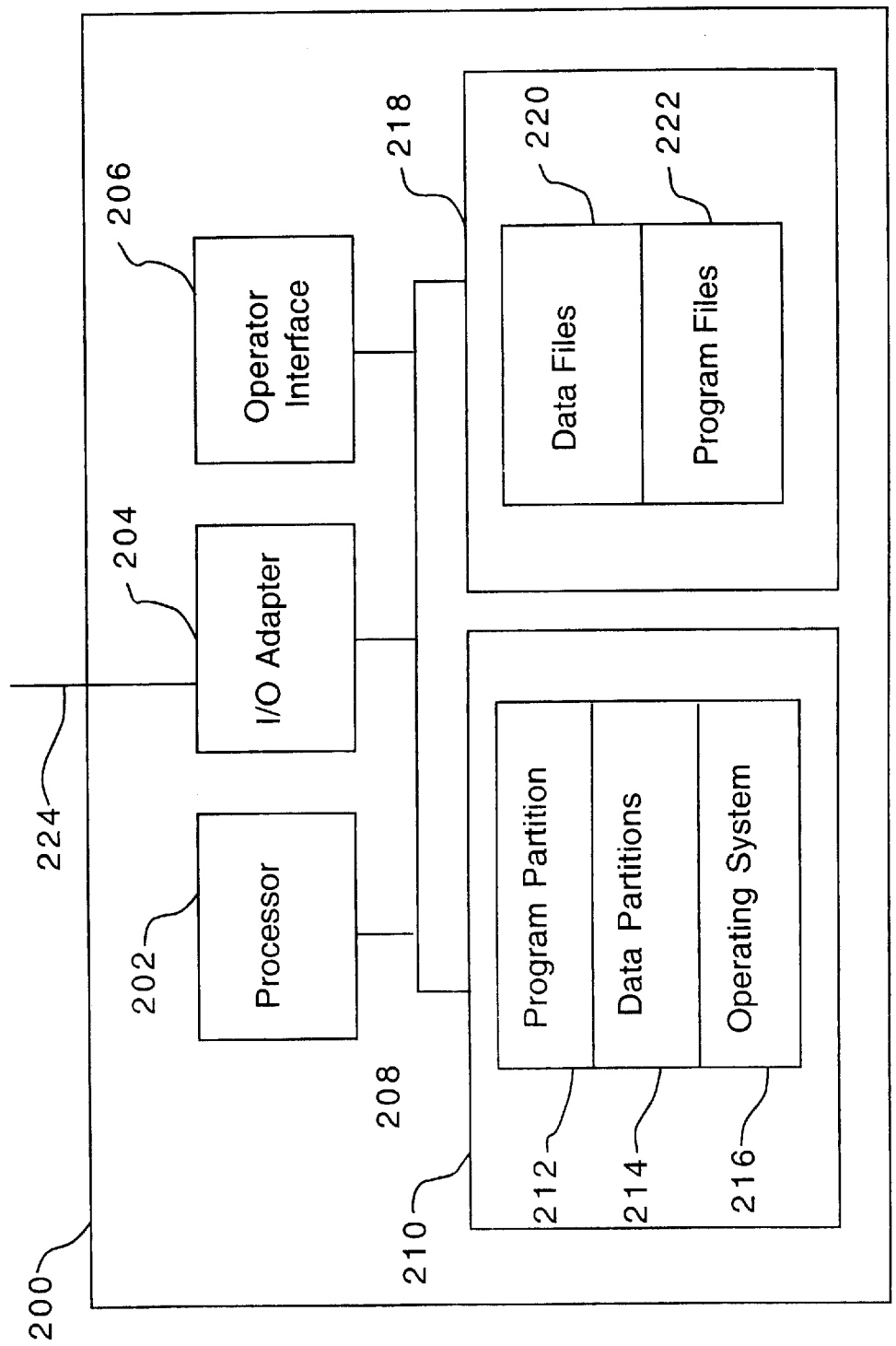
FIG. 2 is a block diagram of a computer system in accordance with one embodiment of the invention.

FIG. 2 is a block diagram of a computer system 200 which is representative of client computer system 102 and server computer system 104, in accordance with one embodiment of the invention. Each of these blocks represents at least one such computer system. Although only one each of client computer system 102 and server computer system 104 are shown in FIG. 1, it is well known in the art that multiple computer systems can be available and still fall within the scope of the invention. Further, it is also well known in the art that a distributed architecture in which more than one computer system performs each function is entirely equivalent.

In one advantageous embodiment of the invention, computer system 200 represents a portion of a processor-based computer system. Computer system 200 includes a processor 202, an input/output (I/O) adapter 204, an operator interface 206, a memory 210 and a disk storage 218. Memory 210 stores computer program instructions and data. Processor 202 executes the program instructions, and processes the data, stored in memory 210. Disk storage 218 stores data to be transferred to and from memory 210. I/O adapter 204 communicates with other devices and transfers data in and out of the computer system over connection 224. Operator interface 206 interfaces with a system operator by accepting commands and providing status information. All these elements are interconnected by bus 208, which allows data to be intercommunicated between the elements. I/O adapter 204 represents one or more I/O adapters or network interfaces that can connect to local or wide area networks such as, for example, the network described in FIG. 1. Therefore, connection 224 represents a network or a direct connection to other equipment.

Processor 202 can be any type of processor capable of providing the speed and functionality required by the embodiments of the invention. For example, processor 202 could be a processor from a family of processors made by Intel Corporation, Motorola or others.

For purposes of this application, memory 210 and disk 218 are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled, interpreted or installed by an installer before being executed by the processor. Further, system 200 may contain various combinations of machine readable storage devices through other I/O controllers, which are accessible by processor 202 and which are capable of storing a combination of computer program instructions and data.

Memory 210 is accessible by processor 202 over bus 208 and includes an operating system 216, a program partition 212 and a data partition 214. Program partition 212 may be a single or multiple program partition which stores and allows execution by processor 202 of program instructions that implement the functions of each respective system described herein. Data partition 214 is accessible by processor 202 and stores data used during the execution of program instructions. In one embodiment of the invention, program partition 212 contains program instructions that are used to search for information relevant to people and resources in a given technical discipline over a network such as network 104. These program instructions will be referred to herein collectively as a "search module."

I/O adapter 204 includes a network interface that may be any suitable means for controlling communication signals between network devices using a desired set of communications protocols, services and operating procedures. As mentioned previously, in one embodiment of the invention, I/O adapter 204 utilizes the transport control protocol (TCP) of layer 4 and the internet protocol (IP) of layer 3 (often referred to as "TCP/IP"). I/O adapter 204 also includes connectors for connecting I/O adapter 204 with a suitable communications medium (e.g., connection 224). Those skilled in the art will understand that I/O adapter 204 may receive communication signals over any suitable medium such as twisted-pair wire, co-axial cable, fiber optics, radio-frequencies, and so forth.

The operation of systems 100 and 200 may be described in terms of the following embodiments of the invention. A network search is initiated for files of information relevant to people and resources in a particular field using a search list of weighted links to said files. An example of the particular field might be electrical engineering in general and semiconductor design in particular. In this embodiment of the invention, the information is in the form of HTML files and the network is capable of communicating using protocols compatible with the Internet and WWW. The information is retrieved using the appropriate URL and parsed into two general types of information, that is, content and additional links to additional files. Examples of content may include, but are not limited to, text, images, data files, executable files, data, charts, tables, meta tags, program instructions and graphics. The content portion is weighted and copied into memory. A determination is made as to whether the additional links are relevant to the search parameters, which in this embodiment is for people and resources with expertise in the field of electrical engineering and semiconductor design. Those additional links that are deemed relevant are weighted and copied to the initial search list. This process continues until an ending condition occurs, such as the search list becomes empty, a predetermined time limit is met or a request to terminate is received.

In one embodiment of the invention, the search process is performed by selecting a weighted link from the search list based on a predetermined ranking of each weighted link within the group. In one embodiment of the invention, each link within the group is assigned a weight of N. The weight of each link may change depending on various factors, such as whether it was previously processed, the number of key word matches, whether it is in a previously identified relevant domain or is a particular distance from a base weight (e.g., M). In this embodiment of the invention, each weighted link is ranked from most relevant link to least relevant link (e.g., lowest to highest weight), and the link selected is the link with the most relevant rank (e.g., lowest weight). In a general sense, each link that is further away from a seed link is given a higher weight by adding to its weight (e.g., N=N+1). It can be appreciated, however, that the ranking and selection process could be reversed or modified, and still fall within the scope of the invention.

A selected file of information corresponding to the selected weighted link is retrieved. Since the selected weighted link has been selected for processing, the selected weighted link is removed from the search list (e.g., by setting a flag or deleting from the search list).

The selected file is retrieved in a number of ways. For example, if the search process was initiated as part of a master build process, then the selected file is retrieved from the appropriate Internet server using the selected weighted link. If the search process is not initiated as part of a master build process, then a memory is checked to determine whether the selected file has been previously processed. If the selected file has been previously processed, the selected file is retrieved from memory. If the selected file has not been previously processed, however, the selected file is retrieved from the appropriate Internet server.

The relevance determination can be accomplished in any number of ways. For example, in one embodiment of the invention the additional link is compared to an excluded domain file. The excluded domain file includes those links that have been previously determined to be not relevant to the search. If the additional link is found in the excluded domain file, it is dropped and another additional link is selected.

If the additional link is not in the excluded domain file then the additional link is weighted. A master search list comprises a set of links that have been previously determined to be relevant to the search. For example, the master search list may comprise a list of seed URLs or a list of all URLs previously processed by the system. In this embodiment of the invention, the master search list comprises a list of seed URLs and previously identified relevant URLs. Each seed URL is assigned an initial weight of N, while those previously identified relevant URLs may have a weight of N=N+K, where both N and K represent positive integers. The additional link is compared to the master search list. If the additional link is found in the master search list, then a one (1) is added to the weight of the additional link.

If the additional link is not found in the master search list, a determination is made as to whether the additional link has been previously processed. If the additional link has been previously processed, then a determination is made as to whether to adjust the weight of the previously processed additional link. The weight of the previously processed additional link is adjusted in accordance with determination. If the additional link has not been previously processed, a determination is made as to whether to adjust the weight of the unprocessed additional link. The weight of the unprocessed additional link is adjusted in accordance with this determination. In either event, the additional link is copied to a parent/child table, and added to the search list.

Figure 3:
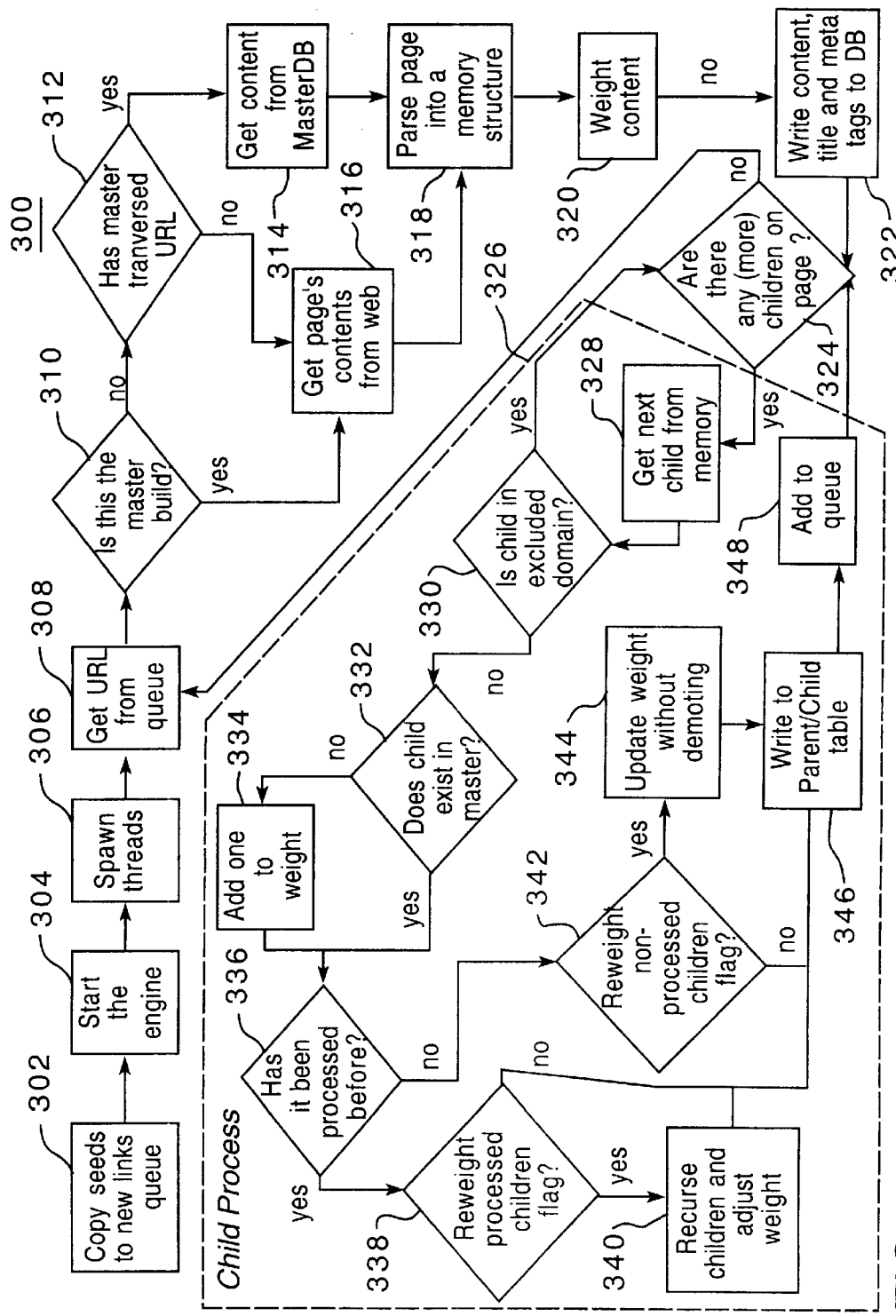
FIG. 3 is a block flow diagram of operations performed by a search module in accordance with one embodiment of the invention.

The operation of systems 100 and 200 and the embodiments of the invention described above will be described in more detail with reference to FIG. 3. Although FIG. 3 presented herein includes a particular sequence of steps, it can be appreciated that the sequence of steps merely provides an example of how the general functionality described herein can be implemented. Further, each sequence of steps does not have to be executed in the order presented unless otherwise indicated. In addition, although the sequence of steps presented in FIG. 3 may be given in more detail than the embodiments of the invention described previously, they are presented only as one particular way of implementing the embodiments of the invention.

FIG. 3 is a block flow diagram of the operations performed by a search module in accordance with one embodiment of the invention. The term "search module" refers to the software and/or hardware used to implement the functionality for searching for information relevant to people and resources in a given technical field as described herein. In this embodiment of the invention, the technical search function is performed by the search module. It can be appreciated that the functionality of the search module, however, can be implemented by any device, or combination of devices, located anywhere in a communication network and still fall within the scope of the invention.

FIG. 3 illustrates a process 300 that is designed to index information accessible through a network. As shown in FIG. 3, seed URLs are copied to a links queue at step 302. The seed URLs represent known web pages that have relevant information to the search. The search engine main thread is started at step 304 and the threads that process and traverse the URLs in the links queue are spawned at step 306. A URL is retrieved from the links queue for processing at step 308. A determination is made as to whether the search process is for a master build process at step 310. The master build process is identified as a process where the search results are saved in a master database as a master for future searches. If the search process is for a master build process at step 310, then the content for all URLs stored in the links queue will be retrieved from the original sources at step 316, e.g., the web page stored in the Internet server as identified by the unique URL. If the search process is not a master build search process at step 310, a determination is made as to whether the web page corresponding to the retrieved URL has been previously processed and indexed in the master database at step 312. If the web page has been previously processed at step 312, the content for the web page is retrieved from the master database at step 314. If the web page has not been previously processed at step 312, the content is retrieved from the Internet at step 316.

Once the content is retrieved from steps 314 or 316, the retrieved web page is parsed into a memory structure at step 318. The content is used to weight the retrieved web page for relevance to the initial search parameters at step 320. Relevance is determined by a combination of key word matches, known domains and distance from seed URLs. For example, weighting can be implemented using keyword weighting. Based on a table of relevant or sought after terms, words or phrases, the content of an HTML file is searched for occurrences of such terms, words or phrases. Based on the number of matches found resulting from the search, a delta for the current weight of the page is calculated. One example of this keyword weighting would be if 3 or more keyword matches are made from the keyword list, then the existing weight is decremented (e.g., N=N−1) and this new value is saved as the pages weighting. If only 2 matches are made, then no change in weighting is recorded. Otherwise, if 1 or no matches are found, the page weighting is incremented (e.g., N=N+1). Although one weighting method is described herein, it can be appreciated that any number of weighting algorithms could be used and still fall within the scope of the invention. For example, another potential weighting scheme could include ranking keywords according to a priority scheme, performing a keyword match, scaling the results using the priority scheme, and modifying the weighting of a link by a scaled amount.

Once the contents of the retrieved web page have been properly weighted at step 320, the weighted content is stored in the master database along with other desired information such as the web page title, any meta tags, URLs, weight and so forth.

As part of the parsing operation of step 318, the search process identifies any other links to other web pages or web sites found within the retrieved web page. These types of links are often referred to as "child" links, since they are contained within the originally retrieved web page (which is sometimes referred to as the "parent" web page). A determination is made as to whether there are any child links on the retrieved web page at step 324. If there are additional child links to process at step 324, a child process of the main thread is spawned or initiated at step 326. The child process loops through and processes each child link. If there are no more children in the retrieved web page at step 324, the main thread continues by retrieving the next URL from the links queue at step 308. The main thread continues until an ending condition is reached, such as the links queue becomes empty, a predetermined time limit is reached, or a request to terminate main thread is received.

At step 326, the child process loops through all children that have been parsed into the memory structure at step 318. The next child link is retrieved from memory at step 328. The child link is compared to an excluded domains table at step 330. If the child link is in the excluded domains table at step 330, the next child link is retrieved at steps 324 and 328. If the child link is not in the excluded domains table at step 330, the master data base is searched to determine whether the child link is part of the master data base at step 332. If the child link does not exist in the master data base at step 332, its weight is increased by one (1) at step 334. If the child does exist in the master data base at step 332, a determination is made as to whether the child link has been previously processed at step 336. If the child link has been previously processed at step 336, a check is made as to whether a flag is set to reweight processed children at step 338.

If the flag is set to yes at step 338, the child link is recursed and reweighted at step 340. Using the keyword weighting example, if the new weight based on the keyword matching process results in a different weighting than previously stored for this page, the average of the new and old weighting is rewritten to the database as the new weighting of the page. If a flag is set to rerank reweighted children already traversed, then the children links on this page, if identified as already being traversed, will be offset by the same resulting delta of the reranked child page. The child link is then copied to a parent/child table at step 346, and added to the links queue for processing at step 348.

If the child link has not been previously processed at step 336, a check is made as to whether a flag is set to reweight non-processed children at step 342. If the flag is set to "yes" at step 342, the weight for the child link is updated without demoting at step 344. The child link is then copied to the parent/child table at step 346, and added to the links queue for processing at step 348.

The operation of system 100 and the flow diagram shown in FIG. 3 can be better understood by way of example. For purposes of clarity, this document uses the term rank in reference to the weighting mechanism. The search module can rank the relevance of a link in two ways: (a) according to the number of matches against a list of keywords, and (b) how many times it has been processed before. The ranking of a link is measured as an integer value, with zero being the most relevant, and the higher values being less relevant. When a link is added to the queue for processing, it's rank value is set one larger than that of the parent.

Figure 4:
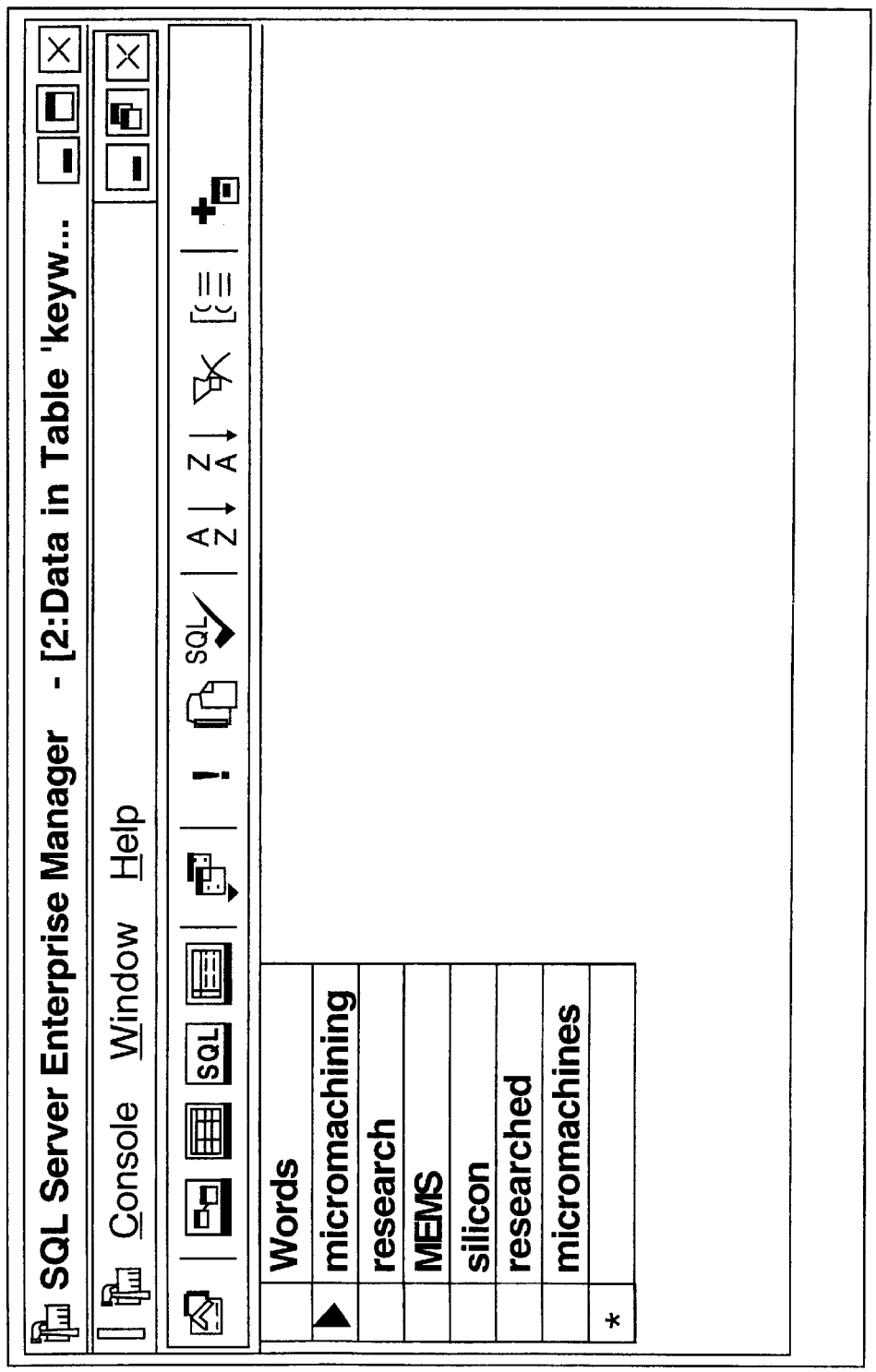
FIG. 4 is an image of a database program having a list of keywords in accordance with one embodiment of the invention.

FIG. 4 is an image of a database program having a list of keywords in accordance with one embodiment of the invention. When the search module processes links, it looks for matches with a list of keywords and keeps track of the number of keywords matched. Keywords may be any set of characters, including multiple word phrases. FIG. 4 illustrates a list with the following keywords: micromachining; research; MEMS; silicon; researched, and micromachines (KeyTable.bmp). It can be appreciated, however, that this list of keywords can be as lengthy or detailed as needed for construction of the database of weighted web pages. Depending on the weighting mechanism employed, a longer list of keywords could result in greater or fewer resultant pages.

The total number of keywords found in the text of a document can adjust the rank of a document according to a set of rules. For illustrative purposes, one such rule is described and detailed below:

If 1 or 0 keywords match, do not adjust the rank value of the document link (it remains one higher than that of the parent link).

If 2 keywords match, decrease the rank value by one (the rank value now equals that of the parent).

If 3 keywords match, decrease the rank value by two (the rank value is now one lower than that of the parent).

FIG. 5 is an image of a database program having a first list of weighted URLs in accordance with one embodiment of the invention. FIG. 5 illustrates a database of information regarding indexed web pages, including for each web page a weight, content for the corresponding HTML document, the URL address, the URL of the parent HTML document, the number of keyword matches, the iteration and a URL identifier ("ID"). In this example, the full text content of the web page corresponding to the URL having an ID of 11 is compared to the key word list shown in FIG. 4. The comparison results indicate that the content has three keyword matches indicated in bold as follows "[w]e have researched silicon based micromachines under adverse conditions." The results of the keyword matching are shown in FIG. 6.

FIG. 6 is an image of a database program having a second list of weighted URLs in accordance with one embodiment of the invention. As shown in FIG. 6, several information fields for the URL having an ID of 11 have been modified due to the keyword matching process. Since the URL content has three keyword matches, the weight of the URL is adjusted from 2 to 0 (i.e., original weight is N=2, adjusted weight is N=N−2 or 0). Further, the value in the "KeyWordMatch" field is modified from "<NULL>" to 3. Since the URL having an ID of 11 has 3 keyword matches, the weight of the URL is adjusted to reflect a higher level of relevance. In this case, the weight of the URL is lowered from 2 to 0, which is a weight that is less than the weight assigned to seed or parent URLs (e.g., 1).

Another example of the weighting adjustment based on keyword matching is once again illustrated in FIGS. 5 and 6 for the URL having an ID of 10. A keyword match of the content of the URL having an ID of 10 with the keylist results in the following keyword matches as indicated in bold "[s]ilicon based MEMS projects of 1999–2000". As a result of matching 2 keywords, the weight for the URL having an ID of 10 is modified from 2 to 1 (equal to the parent link rank), as seen in the transition between the images shown in FIGS. 5 and 6 for the URL having an ID of 10.

Yet another example of the weighting adjustment based on keyword matching can be illustrated using FIGS. 5 and 6 for the URL having an ID of 9. A keyword match of the content of the URL having an ID of 9 with the keylist results in the following keyword matches as indicated in bold "[r]esearch needs for the field". As a result of matching 1 keyword, the weight for the URL having an ID of 9 remains unchanged (e.g., it remains one higher than the parent weight).

FIG. 7 is an image of a database program having a third weighted list of URLs in accordance with one embodiment of the invention. The keyword matching process assumes that the more frequently a link is encountered the more relevant it is. If a link is encountered twice (it has been processed before), the mechanism finds all of the descendants of the preprocessed link and decrements their rank value by one (increases their relevance). This behavior can be demonstrated using the URL having an ID of 8. The URL having an ID of 8 (i.e., "mems.cwru.edu/Pages/contactus.html") is a child of a parent URL "www.case.cwr-u.edu" (i.e., ID 17). As shown in FIG. 7, the URL having an ID of 8 has a given weight of 2.

FIG. 8 is an image of a database program having a fourth weighted list of URLs in accordance with one embodiment of the invention. As shown in FIG. 8, the parent URL "www.case.cwru.edu" (i.e., ID 17) has a flag set to "1" in the "processedbefore" field indicating that this parent URL has been previously processed. Consequently, the weights for the children of "www.case.cwru.edu" (i.e., ID 17) are all decremented by 1. Since the URL having an ID of 8 (i.e., "mems.cwru.edu/Pages/contactus.html") is a child of a parent URL "www.case.cwru.edu" (i.e., ID 17), its weight is decremented from 2 to 1 to indicate that it is considered by the process to be more relevant due to the preprocessing criteria.

Although various embodiments are specifically illustrated and described herein, it will be appreciated that modifications and variations of the present invention are covered by the above teachings and within the purview of the appended claims without departing from the spirit and intended scope of the invention. For example, although the embodiments of the invention implement the functionality of the processes described herein in software, it can be appreciated that the functionality of these processes may be implemented in hardware, software, or a combination of hardware and software, using well-known signal processing techniques. In another example, the embodiments were described using a communication network. A communication network, however, can utilize an infinite number of network devices configured in an infinite number of ways. The communication network described herein is merely used by way of example, and is not meant to limit the scope of the invention.

What is claimed is:

1. A method to index network information, comprising:
   (a) establishing a list of parameters to be searched over a network;
   (b) establishing a search list of weighted links;
   (c) assigning a predetermined initial weight to each parent link in said search list;
   (d) searching said network for files of information containing one or more of said parameters using said search list of weighted links to said files;
   (e) parsing said information into content and additional links to additional files;
   (f) weighting said content;
   (g) copying said weighted content into a memory;
   (h) comparing each of said additional links to a locally-stored excluded domain file, wherein said excluded domain file contains a list of irrelevant links;
   (i) identifying those of said additional links that are found relevant in accordance with said comparison using said excluded domain file;
   (j) assigning a predetermined link weight to each said relevant additional link, wherein each said relevant additional link is initially assigned an identical link weight that is different from said initial weight of a corresponding parent link;
   (k) adjusting said link weight of each said relevant additional link to be more than, less than or equal to said initial weight of said corresponding parent link depending on at least one of the following:
      whether said relevant additional link has been previously processed,
      whether said relevant additional link has been previously unprocessed, and
      a number of said parameters present in said content corresponding to said relevant additional link;
   (l) copying said relevant additional weighted links to said search list; and
   (m) performing steps (d)–(l) until an ending condition occurs.

2. The method of claim 1, wherein said ending condition comprises one of said search list becoming empty, a predetermined time limit is met, and receiving a request to terminate.

3. The method of claim 1, wherein said network uses an Internet protocol.

4. The method of claim 1, wherein said network uses at least one of a World Wide Web protocol and a File Transfer Protocol.

5. The method of claim 1, wherein said links each comprise a universal resource locator.

6. The method of claim 1, wherein said files each comprise at least one of a text file, a Portable Document Format (PDF) file, a hypertext markup language (HTML) file, an Extensible HTML (XHTML) file, an Extensible Markup Language (XML) file, an Excel Table Markup Language (XTML) file, a Virtual Reality Modeling Language (VRML) and a VHML file.

7. The method of claim 1, wherein said content comprises at least one of a group comprising text, images, data files, executable files, data, charts, tables, meta tags, program instructions and graphics.

8. The method of claim 1, wherein searching said network comprises:
   selecting a weighted link from said search list based on a predetermined ranking of each said weighted link within said search list;
   retrieving a selected file of information corresponding to said selected weighted link; and
   removing said selected weighted link from said search list.

9. The method of claim 8, wherein said retrieving said selected file comprises:
   determining whether said searching is for a master build process;
   retrieving said selected file of information from said network if said searching is for said master build process;
   determining whether said selected file of information has been previously indexed into said memory if said searching is not for said master build process;
   retrieving said selected file of information from said memory if said selected file of information has been previously indexed into said memory; and
   retrieving said selected file of information from said network if said selected file of information has not been previously indexed into said memory.

10. The method of claim 8, wherein said selecting comprises:
    ranking each weighted link from lowest weight to highest weight; and
    selecting a weighted link with a lowest weight.

11. The method of claim 8, wherein said selecting comprises:
    ranking each weighted link from highest weight to lowest weight; and
    selecting a weighted link with a highest weight.

12. The method of claim 1, further comprising copying said additional links to a parent-child table.

13. The method of claim 1, wherein said parameters represents at least one of the following categories of information: text; images; data; meta tags; program instructions; and graphics.

14. A machine-readable medium whose contents cause a computer system to index network information by performing the following:
    (a) establishing a list of parameters to be searched over a network;
    (b) establishing a search list of weighted links;
    (c) assigning a predetermined initial weight to each parent link in said search list;
    (d) searching said network for files of information containing one or more of said parameters using said search list of weighted links to said files;
    (e) parsing said information into content and additional links to additional files;
    (f) weighting said content;
    (g) copying said weighted content into a memory;
    (h) comparing each of said additional links to a locally-stored excluded domain file, wherein said excluded domain file contains a list of irrelevant links;
    (i) identifying those of said additional links that are found relevant in accordance with said comparison using said excluded domain file;

(j) assigning a predetermined link weight to each said relevant additional link, wherein each said relevant additional link is initially assigned an identical link weight that is different from said initial weight of a corresponding parent link;

(k) adjusting said link weight of each said relevant additional link to be more than, less than or equal to said initial weight of said corresponding parent link depending on at least one of the following:
whether said relevant additional link has been previously processed,
whether said relevant additional link has been previously unprocessed, and
a number of said parameters present in said content corresponding to said relevant additional link;

(l) copying said relevant additional weighted links to said search list; and (m) performing steps (d)–(l) until an ending condition occurs.

15. The machine-readable medium of claim 14, wherein said ending condition comprises one of said search list becoming empty, a predetermined time limit is met, and receiving a request to terminate.

16. The machine-readable medium of claim 14, wherein said network uses an Internet protocol.

17. The machine-readable medium of claim 14, wherein said network uses at least one of a World Wide Web protocol and a File Transfer Protocol.

18. The machine-readable medium of claim 14, wherein said links each comprise a universal resource locator.

19. The machine-readable medium of claim 14, wherein said files each comprise at least one of a text file, a Portable Document Format (PDF) file, a hypertext markup language (HTML) file, an Extensible HTML (XHTML) file, an Extensible Markup Language (XML) file, an Excel Table Markup Language (XTML) file, a Virtual Reality Modeling Language (VRML) and a VHML file.

20. The machine-readable medium of claim 14, wherein said content comprises at least one of a group comprising text, images, data files, executable files, data, charts, tables, meta tags, program instructions and graphics.

21. The machine-readable medium of claim 14, wherein searching said network comprises:
selecting a weighted link from said search list based on a predetermined ranking of each said weighted link within said search list;
retrieving a selected file of information corresponding to said selected weighted link; and
removing said selected weighted link from said search list.

22. The machine-readable medium of claim 21, wherein said retrieving said selected file comprises:
determining whether said searching is for a master build process;
retrieving said selected file of information from said network if said searching is for said master build process;
determining whether said selected file of information has been previously indexed into said memory if said searching is not for said master build process;
retrieving said selected file of information from said memory if said selected file of information has been previously indexed into said memory; and
retrieving said selected file of information from said network if said selected file of information has not been previously indexed into said memory.

23. The machine-readable medium of claim 21, wherein said selecting comprises:
ranking each weighted link from lowest weight to highest weight; and
selecting a weighted link with a lowest weight.

24. The machine-readable medium of claim 21, wherein said selecting comprises:
ranking each weighted link from highest weight to lowest weight; and
selecting a weighted link with a highest weight.

25. The machine-readable medium of claim 14, further comprising copying said additional links to a parent-child table.

26. The machine-readable medium of claim 14, wherein said parameters represent at least one of the following categories of information: text; images; data; meta tags; program instructions; and graphics.

27. An apparatus to index network information, comprising:
(a) means for establishing a list of parameters to be searched over a network;
(b) means for establishing a search list of weighted links;
(c) means for assigning a predetermined initial weight to each parent link in said search list;
(d) means for searching said network for files of information containing one or more of said parameters using said search list of weighted links to said files;
(e) means for parsing said information into content and additional links to additional files;
(f) means for weighting said content;
(g) means for copying said weighted content into a memory;
(h) means for comparing each of said additional links to a locally-stored excluded domain file, wherein said excluded domain file contains a list of irrelevant links;
(i) means for identifying those of said additional links that are found relevant in accordance with said comparison using said excluded domain file;
(j) means for assigning a predetermined link weight to each said relevant additional link, wherein each said relevant additional link is initially assigned an identical link weight that is different from said initial weight of a corresponding parent link;
(k) means for adjusting said link weight of each said relevant additional link to be more than, less than or equal to said initial weight of said corresponding parent link depending on at least one of the following:
whether said relevant additional link has been previously processed,
whether said relevant additional link has been previously unprocessed, and
a number of said parameters present in said content corresponding to said relevant additional link;
(l) means for copying said relevant additional weighted links to said search list; and
(m) means for performing functions in (d)–(l) until an ending condition occurs.

28. The apparatus of claim 27, wherein said parameters represent at least one of the following categories of information: text; images; data; meta tags; program instructions; and graphics.

* * * * *